(12) United States Patent
Murayama et al.

(10) Patent No.: US 12,726,832 B2
(45) Date of Patent: Sep. 1, 2026

(54) CONTROL APPARATUS, COMMUNICATION SYSTEM, CONTROL METHOD AND PROGRAM

(71) Applicant: NTT, Inc., Tokyo (JP)

(72) Inventors: Daisuke Murayama, Tokyo (JP); Shota Nakayama, Tokyo (JP)

(73) Assignee: NTT, Inc., Tokyo (JP)

( * ) Notice: Subject to any disclaimer, the term of this patent is extended or adjusted under 35 U.S.C. 154(b) by 350 days.

(21) Appl. No.: 18/560,803

(22) PCT Filed: Jun. 23, 2021

(86) PCT No.: PCT/JP2021/023870
§ 371 (c)(1),
(2) Date: Nov. 14, 2023

(87) PCT Pub. No.: WO2022/269841
PCT Pub. Date: Dec. 29, 2022

(65) Prior Publication Data
US 2024/0251253 A1 Jul. 25, 2024

(51) Int. Cl.
*H04W 16/18* (2009.01)
*H04W 4/029* (2018.01)
(Continued)

(52) U.S. Cl.
CPC ........... *H04W 16/24* (2013.01); *H04W 4/029* (2018.02); *H04W 84/005* (2013.01)

(58) Field of Classification Search
None
See application file for complete search history.

(56) References Cited

U.S. PATENT DOCUMENTS

2018/0120412 A1* 5/2018 Kim .......................... G01S 1/02
2019/0053191 A1* 2/2019 Balappanavar ......... H04W 4/44
(Continued)

FOREIGN PATENT DOCUMENTS

CN 112585907 A * 3/2021 ............. G01S 7/006
DE 102020203246 A1 * 9/2020 ......... H04B 7/06956
(Continued)

OTHER PUBLICATIONS

Yoshihisa KISHIYAMA et al., "5G Field Testing For Ultra-High Speed And Long Distance Transmission Using Millimeter Waves", NTT Docomo Technical Journal (vol. 26-1, p. 25-32), Apr. 2018.

*Primary Examiner* — Mohammed Rachedine
(74) *Attorney, Agent, or Firm* — IPUSA, PLLC

(57) ABSTRACT

Provided is a control apparatus in a wireless communication system including the control apparatus and a plurality of base stations, the control apparatus including: an information acquisition unit that acquires position information of one or more specific priority terminals and shield sensing information; a shield map generation unit that generates a shield map based on the shield sensing information; a line-of-sight determination unit that determines whether or not there is a line of sight from an antenna of each base station to each specific priority terminal based on the position information and the shield map; and a base station control unit that controls movable base stations in the plurality of base stations such that the number of specific priority terminals in a line-of-sight state from the plurality of base stations becomes a maximum.

7 Claims, 6 Drawing Sheets

(51) Int. Cl.

| | |
|---|---|
| ***H04W 16/24*** | (2009.01) |
| ***H04W 16/28*** | (2009.01) |
| *H04W 84/00* | (2009.01) |

(56) References Cited

U.S. PATENT DOCUMENTS

2019/0182683 A1* 6/2019 Khirallah .............. H04W 16/28
2021/0281309 A1* 9/2021 Verma .................. H04B 7/0623

FOREIGN PATENT DOCUMENTS

JP 2018006844 A * 1/2018
WO WO-2018030510 A1 * 2/2018 ............ H04W 16/28
WO WO-2019133048 A1 * 7/2019 ............ H04W 40/24

* cited by examiner

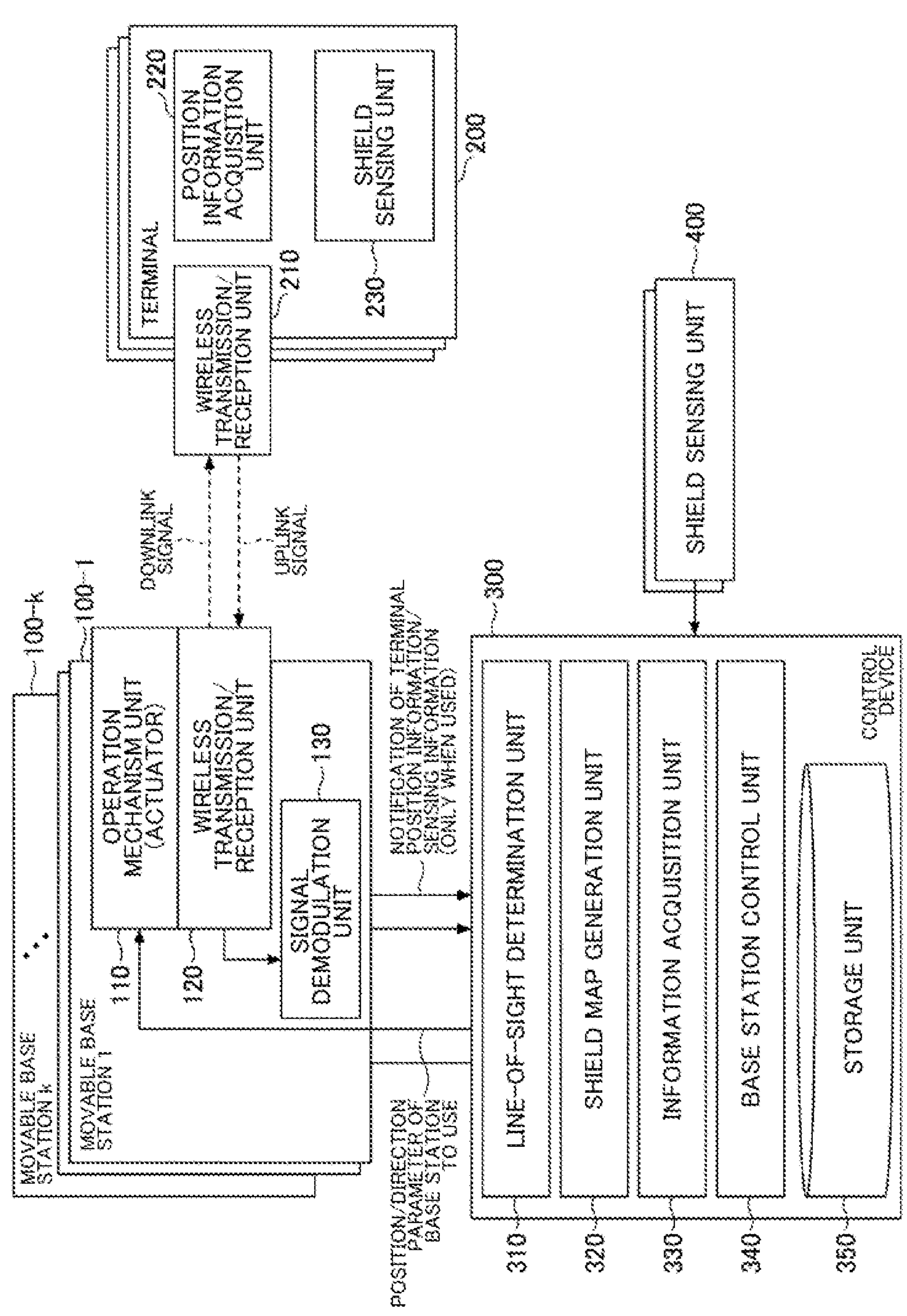
Fig. 3
MOVABLE BASE STATION k
100-k
MOVABLE BASE STATION 1
100-1
OPERATION MECHANISM UNIT (ACTUATOR)
110
WIRELESS TRANSMISSION/ RECEPTION UNIT
120
SIGNAL DEMODULATION UNIT
130
DOWNLINK SIGNAL
UPLINK SIGNAL
TERMINAL
WIRELESS TRANSMISSION/ RECEPTION UNIT
210
POSITION INFORMATION ACQUISITION UNIT
220
SHIELD SENSING UNIT
230
200
SHIELD SENSING UNIT
400
NOTIFICATION OF TERMINAL POSITION INFORMATION/ SENSING INFORMATION (ONLY WHEN USED)
POSITION/DIRECTION PARAMETER OF BASE STATION TO USE
300
CONTROL DEVICE
LINE-OF-SIGHT DETERMINATION UNIT
310
SHIELD MAP GENERATION UNIT
320
INFORMATION ACQUISITION UNIT
330
BASE STATION CONTROL UNIT
340
STORAGE UNIT
350

CONTROL APPARATUS, COMMUNICATION SYSTEM, CONTROL METHOD AND PROGRAM

TECHNICAL FIELD

The present invention relates to a method of controlling a base station in a wireless communication system.

BACKGROUND ART

The introduction of 5G, which realizes large-capacity systems, high-speed data transmission speeds, low latency, simultaneous connection of many terminals or the like, is underway. In 5G, in addition to the frequency bands used in current mobile communications, high frequency bands such as millimeter wave bands are used (NPL 1).

CITATION LIST

Non Patent Literature

NPL 1: 5G Field Testing For Ultra-High Speed And Long Distance Transmission Using Millimeter Waves, Kishiyama, Okumura, et al., NTT DOCOMO Technical Journal (Vol. 26-1, P 25-32)

SUMMARY OF INVENTION

Technical Problem

There is a use case in which a terminal (an example of a specific priority terminal) for connecting a production robot and an automated guided vehicle (AGV) controlled from a remote place is accommodated in an area of a high frequency band and controlled in a factory. In such a specific priority terminal, a redundant connection state in which a plurality of base stations are connected is desirable in order to maintain communication reliability.

However, communication quality is not stable in a factory where there are many shields and the shields move. In addition, radio waves in high frequency bands such as 5G have highly rectilinear propagation and large losses due to shielding. Therefore, it is difficult to maintain the redundant connection state.

The present invention has been made in view of the above points, and an object of the present invention is to provide a technique capable of maintaining a redundant connection state of a specific priority terminal even in an environment where there is a shield.

Solution to Problem

According to the disclosed technique, there is provided a control apparatus in a communication system including the control apparatus and a plurality of base stations, the control apparatus including:

- an information acquisition unit that acquires position information of one or more specific priority terminals and shield sensing information;
- a shield map generation unit that generates a shield map based on the shield sensing information;
- a line-of-sight determination unit that determines whether or not there is a line of sight from an antenna of each base station to each specific priority terminal based on the position information and the shield map; and
- a base station control unit that controls movable base stations in the plurality of base stations such that the number of specific priority terminals in a line-of-sight state from the plurality of base stations becomes a maximum.

Advantageous Effects of Invention

According to the disclosed technique, it is possible to maintain the redundant connection state of the specific priority terminal even in an environment where there is a shield.

BRIEF DESCRIPTION OF DRAWINGS

FIG. 3 is a diagram illustrating a configuration of each device in a communication system.

DESCRIPTION OF EMBODIMENTS

Figure 1:
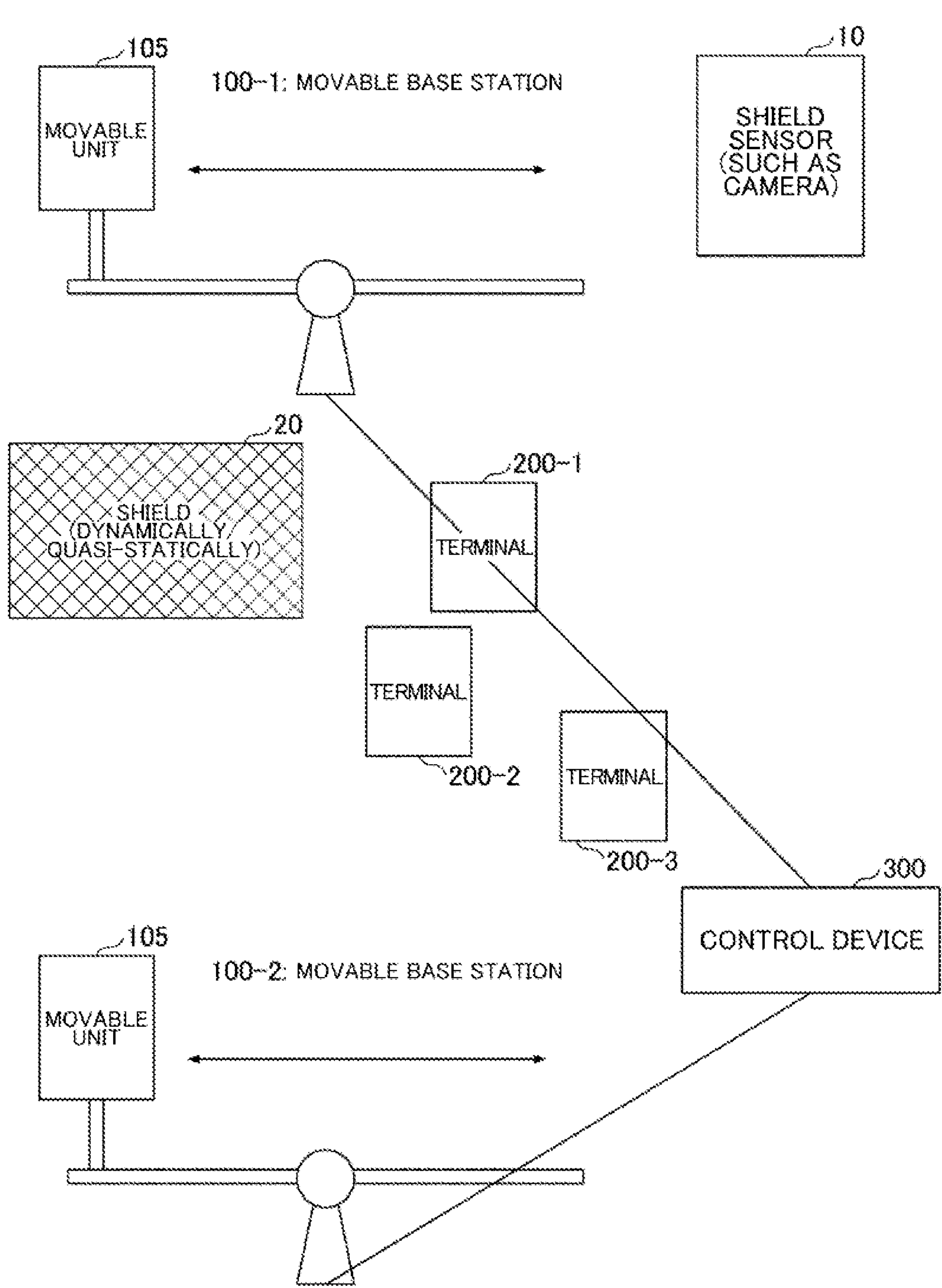
FIG. 1 is a diagram illustrating a configuration example of a communication system according to an embodiment of the present invention.

Hereinafter, an embodiment of the present invention (the present embodiment) will be described with reference to the drawings. The embodiment described below is merely an example, and embodiments to which the present invention is applied are not limited to the following embodiment.

Overview of Embodiment

In the present embodiment, mainly for communication systems such as 5G and for use cases that require communication reliability of specific priority terminals, a technique for maintaining a redundant connection state of specific priority terminals in a factory with many shields will be described.

The specific priority terminal is, for example, a terminal for connecting a production robot and an automated guided vehicle (AGV) controlled from a remote place. Such a specific priority terminal needs to maintain a redundant connection state in order to maintain communication reliability. However, in a factory where there are many shields and the shields move, communication is interrupted and it is difficult to maintain the redundant connection state as described above. Therefore, in the present embodiment, the redundant connection state is maintained by controlling the position and direction of an antenna of a movable base station.

Control for maintaining the redundant connection state of the specific priority terminal is performed by a control device 300 (control apparatus), which will be described later. The outline of control is as follows.

The control device 300 calculates and stores the number of specific priority terminals Np in a line of sight from a plurality of base stations and the coverage area quality (for example, the number of coverage area elements Ne in a line of sight) for each combination of position/direction parameters of antennas of movable base stations based on shield sensing information (generated from camera image information and LiDAR information) and position information of specific priority terminals.

Then, the control device 300 calculates antenna position/direction parameters that maximize coverage area quality (Ne or the like) among combinations of antenna position/direction parameters that maximize Np, and performs control to move an antenna of a movable base station 100 by using the calculated parameters.

Through the above-described control, it is possible to maintain the redundant connection state of the specific priority terminal and improve communication reliability even in an environment where there are shields and the shields move.

The present embodiment will be described in more detail below.

(System Configuration Example)

In the present embodiment, it is assumed that the communication area of the wireless communication system is formed in an environment such as a factory or warehouse where a large shield moves quasi-statically or dynamically. A communication area is covered by a single base station or a plurality of base stations.

The present invention can be applied to any wireless communication system. However, the present embodiment mainly assumes a wireless communication system such as 5G, and particularly a wireless communication system using a frequency having highly rectilinear propagation, such as Above-6 GHz.

FIG. 1 illustrates an overall configuration example of a communication system according to the present embodiment. As illustrated in FIG. 1, the communication system includes a movable base station 100-1, a movable base station 100-2, a shield sensor 10, a shield 20, a plurality of terminals 200-1 to 200-3, and a control device 300.

The shield sensor 10 may be any sensor as long as it can detect a shield. The shield sensor 10 is, for example, a camera, a LiDAR, or the like. The shield 20 may be a fixed object or a moving object. As the shield 20, for example, materials, machines, shelves, people, etc., in the factory are assumed.

Each of the terminals 200-1 to 200-3 is a terminal having a function of wirelessly communicating with the movable base station 100. Some or all of the terminals 200-1 to 200-3 are specific priority terminals. The specific priority terminal is, for example, a terminal for connecting a production robot and an automated guided vehicle (AGV) controlled from a remote place.

The control device 300 controls the movable base station 100. The control device 300 may be disposed near the movable base station 100 or at a remote location via a network. The control device 300 may be provided in the movable base station 100. A wired connection or a wireless connection (IAB, WiGig, etc.) may be used between the movable base station 100 and the control device 300.

The movable base station 100 is a base station capable of moving a movable unit 105 which is a part including an antenna serving as a transmission/reception point of radio signals. The direction of the antenna is also variable. It is sufficient as long as the movable unit 105 includes an antenna, and a functional unit other than the antenna may be provided. The movable unit 105 may be an antenna itself.

Figure 2:
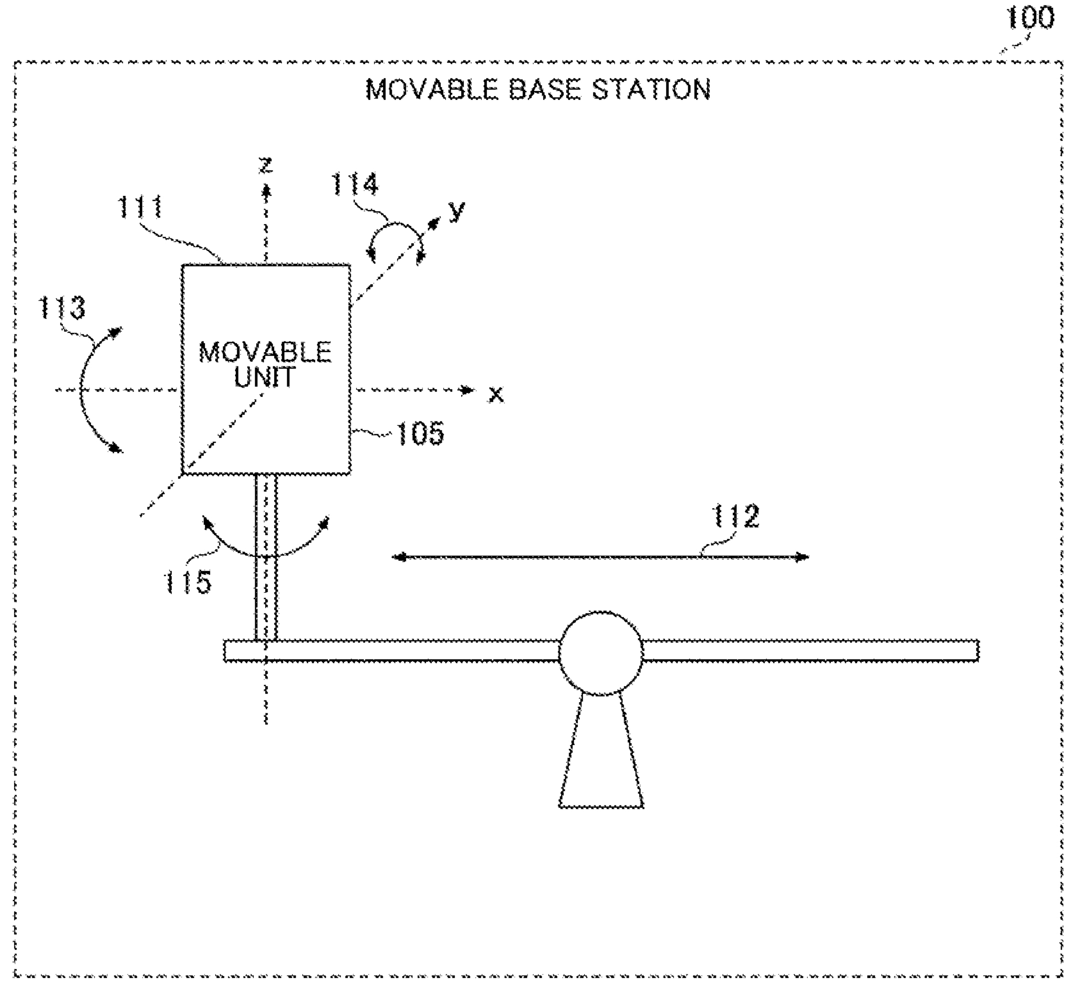
FIG. 2 is a diagram for describing a movable base station 100.

As illustrated in FIG. 2, for example, in the movable base station 100, the position of the movable unit 105 can be changed in the direction indicated by reference numeral 112 by sliding the movable unit 105 on a rail. The rail can also be rotated in the horizontal direction. With this movement control, the movable unit 105 can be disposed at any position within a predetermined range.

Also, regarding antenna direction control, for example, the movable unit 105 can be rotated around an x-axis (see reference numeral 113), around a y-axis (see reference numeral 114), and around a z-axis (see reference numeral 115) by a structure supporting the movable unit 105. With this movement control, the antenna can be oriented in any direction.

It should be noted that the use of the movable base station 100 that slides on the rail as described above is merely an example. Any method may be used as long as the position and direction of the antenna provided by the base station can be changed. For example, the base station may be mounted on a drone or automated guided vehicle (AGV) to control the position and direction of the antenna of the base station, or the position and direction of the antenna of the base station may be controlled manually.

Moreover, although the example illustrated in FIG. 1 illustrates an example in which only the movable base station 100 exists as the base station, a base station having no movable function and a movable base station may be used in combination. In this case, by fixing the position/direction parameters of the base station having no movable function and performing the processing described below, the position/direction parameters can be optimized in the same manner as in the case where only the movable base station 100 is used.

(Detailed Configuration Example)

FIG. 3 illustrates a configuration of each device that constitutes the communication system according to the present embodiment. FIG. 3 illustrates an example in which k movable base stations 100-1 to **100-*k* are provided. When 1 to k are not distinguished from each other, the movable base station will be described as a "movable base station 100." It is also assumed that there are a plurality of terminals 200 and each terminal 200 is a specific priority terminal. A shield sensing unit 400 illustrated in FIG. 3 corresponds to the shield sensor 10 illustrated in FIG. 1. The shield sensing unit 400 may be a functional unit included in the control device 300**.

<Movable Base Station 100>

As illustrated in FIG. 3, the movable base station 100 includes an operation mechanism unit 110, a wireless transmission/reception unit 120, and a signal demodulation unit 130. The operation mechanism unit 110 is a mechanism for operating the movable unit 105 described above. The operation mechanism unit 110 may be called an actuator. The movable unit 105 may be the wireless transmission/reception unit 120.

The wireless transmission/reception unit 120 has an antenna and transmits and receives radio signals. The signal demodulation unit 130 receives an uplink signal from the wireless transmission/reception unit 120, demodulates the uplink signal, and transmits the demodulated signal to the control device 300.

<Terminal 200>

The terminal 200 includes a wireless transmission/reception unit 210, a position information acquisition unit 220, and a shield sensing unit 230. The wireless transmission/reception unit 210 transmits and receives radio signals. The position information acquisition unit 220 acquires position information of the terminal 200 itself. The shield sensing unit 230 detects shields. The shield sensing unit 230 may be a camera, a LIDAR, or other sensors.

When using the position information of the terminal 200 acquired by the terminal 200 in the control device 300, the position information acquisition unit 220 transmits the position information to the movable base station 100 by using an uplink data channel (or control channel), and the movable base station 100 transmits the position information to the control device 300.

The terminal 200 need not include the position information acquisition unit 220. In this case, the control device 300 or the movable base station 100 estimates the terminal position using a camera image or the like.

Shield sensing is performed by the shield sensing unit 400 provided separately from the terminal 200. Here, when the terminal 200 includes the shield sensing unit 230, the shield sensing unit 230 may notify the control device 300 of sensing information (camera image, LIDAR information, etc.) using an uplink signal. The terminal 200 may not include the shield sensing unit 230.

<Control Device 300 (Control Apparatus)>

The control device 300 includes a line-of-sight determination unit 310, a shield map generation unit 320, an information acquisition unit 330, a base station control unit 340, and a storage unit 350. The outline of each unit is as follows.

The information acquisition unit 330 acquires shield sensing information, position information of the specific priority terminal 200, and the like. The shield map generation unit 320 detects a shield based on the shield sensing information, generates a 3D (or 2D) map, and stores the information in the storage unit 350.

The line-of-sight determination unit 310 specifies, for each movable base station, a specific priority terminal and a coverage area element in a line of sight for each parameter of the position and direction of the antenna of the movable base station 100, and stores the information in the storage unit 350. The base station control unit 340 performs movement control and the like for the movable base station 100.

(Operation Example of Communication System)

Figure 4:
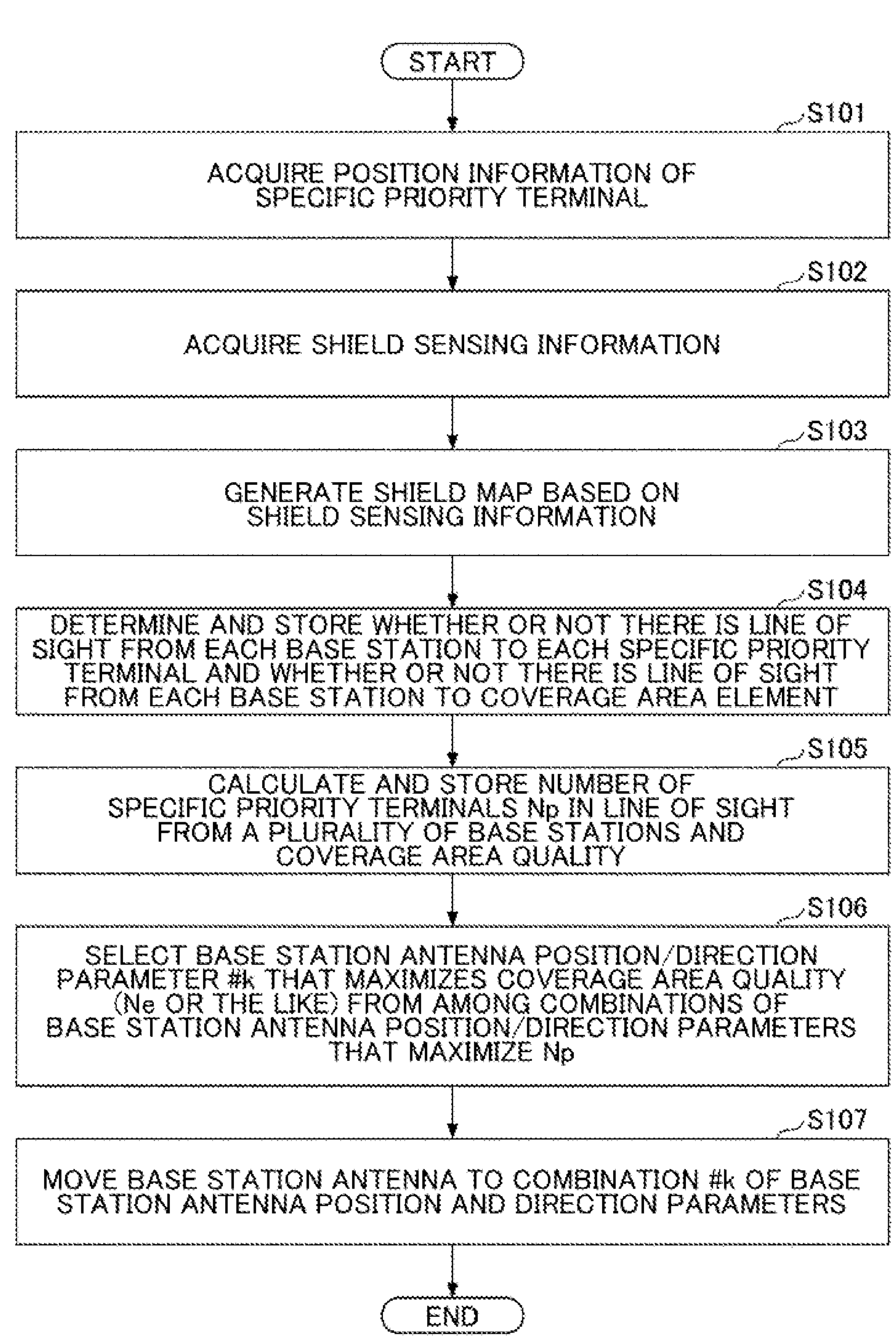
FIG. 4 is a flowchart for describing an operation of the communication system.
Figure 5:
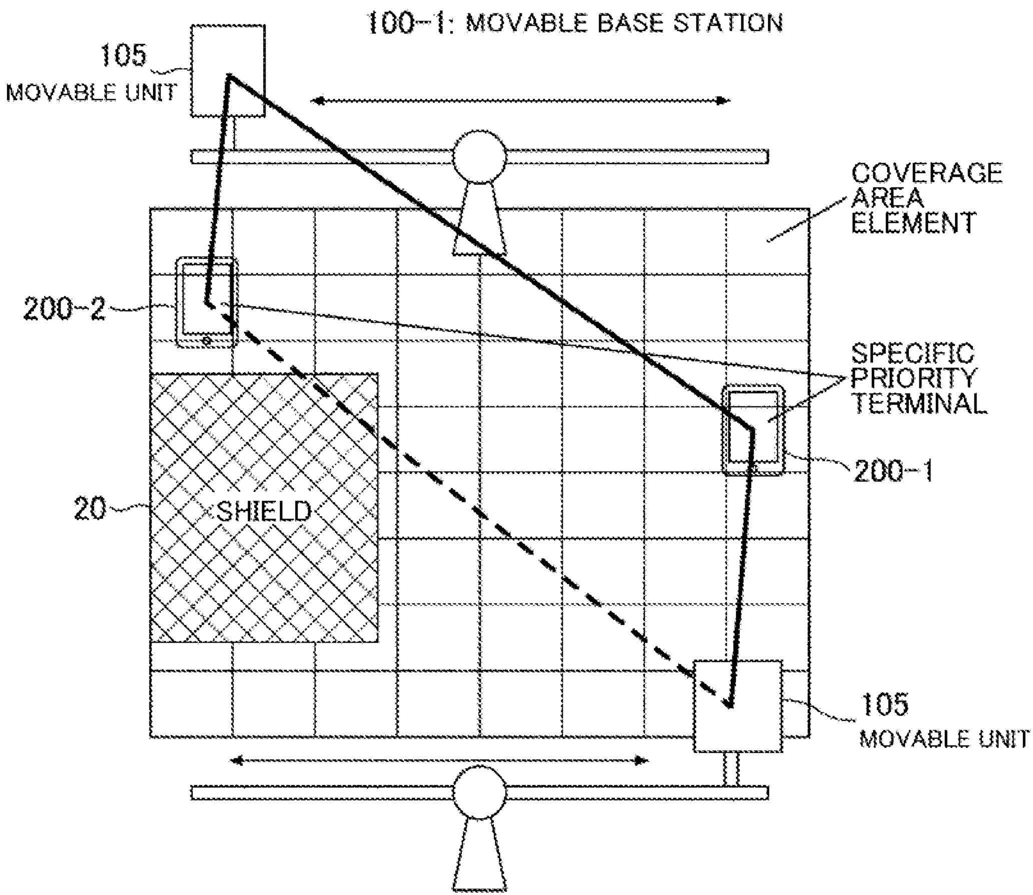
FIG. 5 is a diagram illustrating an example of control of a movable base station.

Next, an operation example of the communication system (especially the control device 300) will be described with reference to the flowchart shown in FIG. 4. FIG. 5 will also be referred to in the description as appropriate.

<S101: Position Information Acquisition>

First, in S101, the information acquisition unit 330 of the control device 300 acquires position information of the specific priority terminal 200. When there are a plurality of specific priority terminals 200, the position information is acquired for each specific priority terminal 200.

The position information may be acquired in any method. For example, position information measured by the specific priority terminal 200 using three-point positioning, GPS, or the like may be reported to the control device 300 through a data channel or a control channel. Alternatively, a scenario for the position of the specific priority terminal 200 may be prepared, and position information (for example, the position at each time) according to the scenario may be stored in the storage unit 350 in advance.

<S102: Shield Sensing Information Acquisition>

In S102, the information acquisition unit 330 acquires shield sensing information (camera image information, LiDAR information, etc.) obtained by the shield sensing unit 400, and stores the shield sensing information in the storage unit 350.

<S103: Shield Map Generation>

In S103, the shield map generation unit 320 detects the shield based on the shield sensing information (camera image information, LiDAR information, etc.) acquired in S102 to generate a 3D (or 2D map). The 3D map includes three-dimensional position information of the shield. The 2D map includes two-dimensional position information of the shield.

<S104: Line-of-Sight Determination>

In S104, the line-of-sight determination unit 310 determines, for each movable base station 100, whether or not there is a line of sight from the movable base station 100 to each specific priority terminal 200 for each combination of parameters indicating the position and direction of the antenna of the movable base station 100 using the position information of the specific priority terminal 200 and the shield map, and stores information on the determined presence/absence of the line of sight in the storage unit 350.

Further, the line-of-sight determination unit 310 determines, for each movable base station 100, whether or not there is a line of sight from the movable base station 100 to each coverage area element for each combination of parameters indicating the position and direction of the antenna of the movable base station 100 using the information of the coverage area element and the shield map, and stores information on the determined presence/absence of the line of sight in the storage unit 350.

For example, it is assumed that there are two specific priority terminals 200-1 and 200-2 with respect to one movable base station 100, and that there are parameters 1 to n indicating the position and direction of the antenna. A parameter m, for example, consists of $\{x_m, y_m, z_m, p_m, c_m, r_m\}$. Here, $x_m$, $y_m$, and $z_m$ are the x-, y-, and z-coordinates of the center position of the antenna, respectively, and $p_m$, $c_m$, and $r_m$ are the pan, tilt, and roll angles of the antenna, respectively.

The line-of-sight determination unit 310 determines whether or not there is a line of sight from the movable base station 100 to the specific priority terminals 200-1 and 200-2 for each parameter, and stores, for example, the following information in the storage unit 350.

"Parameter 1: Presence of Line of Sight to Specific Priority Terminal 200-1, Absence of Line of Sight to Specific Priority Terminal 200-2", "Parameter 2: Presence of Line of Sight to Specific Priority Terminal 200-1, Absence of Line of Sight to Specific Priority Terminal 200-2", . . . , "Parameter n: Absence of Line of Sight to Specific Priority Terminal 200-1, Presence of Line of Sight to Specific Priority Terminal 200-2".

The information is stored in the storage unit 350 for each of the plurality of movable base stations 100.

Next, the coverage area element will be described. As illustrated in FIG. 5, the coverage area element is a small area when an area (coverage area) covered by a plurality of base stations to be controlled is divided into small areas.

For example, assuming that there are nine coverage area elements, it is assumed that parameters 1 to n indicating the position and direction of the antenna exist for one movable base station 100. A parameter m, for example, consists of $\{x_m, y_m, z_m, p_m, c_m, r_m\}$. Here, $x_m$, $y_m$, and $z_m$ are the x-, y-, and z-coordinates of the center position of the antenna, respectively, and $p_m$, $c_m$, and $r_m$ are the pan, tilt, and roll angles of the antenna, respectively.

The line-of-sight determination unit 310 determines whether or not there is a line of sight from the movable base station 100 to each coverage area element for each parameter, and stores, for example, the following information in the storage unit 350.

"Parameter 1: Presence of Line of Sight to Coverage Area Element 1, Presence of Line of Sight to Coverage Area Element 2, . . . , Presence of Line of Sight to Coverage Area Element 9," "Parameter 2: Absence of Line of Sight to Coverage Area Element 1, Absence of Line of Sight to Coverage Area Element 2, . . . , Presence of Line of Sight to Coverage Area Element 9," . . . , "Parameter n: Presence of Line of Sight to Coverage Area Element 1, Presence Absence of Line of Sight to Coverage Area Element 2, . . . , Presence of Line of Sight to Coverage Area Element 9."

The information is stored in the storage unit 350 for each of the plurality of movable base stations 100.

<S105: Number of Terminals and Coverage Area Quality Calculation>

The base station control unit 340 (or the line-of-sight determination unit 310) calculates the number of specific priority terminals Np in a line of sight from a plurality of base stations and the coverage area quality (for example, the number of coverage area elements Ne in a line of sight) for each combination of parameters indicating the position and direction of the antenna of the movable base station 100, and stores the calculated information.

For example, as illustrated in FIG. 5, assuming that there are the movable base station 100-1 and the movable base station 100-2 and the specific priority terminal 200-1 and the specific priority terminal 200-2, when the movable base station 100-1 is a parameter a and the movable base station 100-2 is a parameter b, if both the movable base station 100-1 and the movable base station 100-2 have a line of sight to the specific priority terminal 200-1, but only the movable base station 100-1 has a line of sight to the specific priority terminal 200-2, the number of specific priority terminals Np in a line of sight from a plurality of movable base stations is 1 for a parameter combination of "movable base station 100-1: parameter a, movable base station 100-2: parameter b".

Also, for example, when the number of coverage area elements in a line of sight from either the movable base station 100-1 or the movable base station 100-2 is 8 for the parameter combination of "movable base station 100-1: parameter a, movable base station 100-2: parameter b", the coverage area quality is calculated as 8.

As one example, the coverage area quality may be set to the number of coverage area elements in a line of sight from any of the movable base stations. The coverage area quality may be set to the number of coverage area elements in a line of sight from a plurality of movable base stations, or other indexes may be set as the coverage area quality.

<S106: Parameter Selection>

In S106, the base station control unit 340 selects an antenna position/direction parameter #k that maximizes coverage area quality (Ne or the like) from among combinations of antenna position/direction parameters that maximize Np.

For example, as illustrated in FIG. 5, assuming that there are the movable base station 100-1 and the movable base station 100-2 and the specific priority terminal 200-1 and the specific priority terminal 200-2, in both cases of "movable base station 100-1: parameter c, movable base station 100-2: parameter d" and "movable base station 100-1: parameter e, movable base station 100-2: parameter f", NP is assumed to be 2 at the maximum.

Then, assuming that "movable base station 100-1: parameter c, movable base station 100-2: parameter d" has a higher coverage area quality than "movable base station 100-1: parameter e, movable base station 100-2: parameter f", the base station control unit 340 selects the "movable base station 100-1: parameter c, movable base station 100-2: parameter d" as the antenna position/direction parameter #k that maximizes the coverage area quality (Ne or the like) from among the combinations of antenna position/direction parameters that maximize Np.

The base station control unit 340 may select any parameter from among the antenna position/direction parameters that maximize Np. In this case, it is not necessary to calculate the coverage area quality.

<S107: Base Station Control>

In S107, the base station control unit 340 transmits the parameter selected in S106 to each movable base station 100 to move the position and direction of the antenna of each movable base station 100 to the position and direction according to the parameter.

By performing the control as described above, it is possible to enable highly reliable communication by the specific priority terminal 200 maintaining the redundant connection state.

(Example of Line-of-Sight Determination Method)

An example of a line-of-sight determination method performed by the line-of-sight determination unit 310 will be described below. Here, the following three examples will be described. The following three methods are examples, and the line-of-sight determination may be performed by a method other than the following three methods.

<Line-of-Sight Determination Method 1>

In a line-of-sight determination method 1, the line-of-sight determination unit 310 defines a line-of-sight area as an area through which a line segment extends from the point at the center position of the antenna until it collides with a wall or a shield. In this method, if the specific priority terminal 200 and the coverage area element are included in the area, it can be determined that the specific priority terminal 200 and the coverage area element are in a line-of-sight state.

According to the line-of-sight determination method 1, the line-of-sight area can be easily calculated only by the area shape, the shield position, and the shield shape regardless of the terminal position.

<Line-of-Sight Determination Method 2>

In a line-of-sight determination method 2, the line-of-sight determination unit 2 calculates the Fresnel zone for each point on a predetermined grid from the point at the center position of the antenna, defines points where a predetermined x % of the Fresnel zone is not shielded as line-of-sight positions, and defines areas around these grids as line-of-sight areas. In this method, if the specific priority terminal 200 and the coverage area element are included in the area, it can be determined that the specific priority terminal 200 and the coverage area element are in a line-of-sight state.

According to the line-of-sight determination method 2, the line-of-sight area can be calculated only by the area shape, the shield position, and the shield shape regardless of the terminal position.

<Line-of-Sight Determination Method 3>

In a line-of-sight determination method 3, the line-of-sight determination unit 310 calculates the Fresnel zone for each terminal from the point at the center position of the antenna, and determines that a terminal in which a predetermined x % of the Fresnel zone is not shielded is a terminal in the line-of-sight state.

According to the line-of-sight determination method 3, when the terminal position is static to some extent, the line-of-sight position of the terminal actually communicating can be determined from the area shape, the shield position, and the shield shape.

<Calculation of Fresnel Zone>

The calculation of the Fresnel zone used in the above-mentioned line-of-sight determination methods 2 and 3 can be performed by the following formulas.

$$d3 = \sqrt{d1^2 + r1^2} + \sqrt{d2^2 + r1^2} - d = \frac{\lambda}{2} \quad \text{[Math. 1]}$$

$$r1(m) = \sqrt{\lambda \frac{d1d2}{d1 + d2}} = \frac{\sqrt{\lambda d}}{2} \quad \text{[Math. 2]}$$

The meanings of the variables used in the above formulas are as follows.

d(m): Shortest distance between transmission side and reception side r1(m): Radius of central part of spheroid (Fresnel radius)

d1(m): Distance between transmission side and center of spheroid d2 (m): Distance between reception side and center of spheroid d3(m): Path difference between reflected wave and direct wave reflected at Fresnel radius portion λ(m): Wavelength (Hardware Configuration Example)

The control device 300 in the present embodiment can be implemented by, for example, causing a computer to execute a program describing details of processing described in the present embodiment. Note that this "computer" may be a physical machine or a virtual machine on the cloud. When using a virtual machine, the "hardware" described here is virtual hardware.

The above program can be stored and distributed by being recorded in a computer-readable recording medium (portable memory or the like). Furthermore, the above program can also be provided through a network such as the Internet or an electronic mail.

Figure 6:
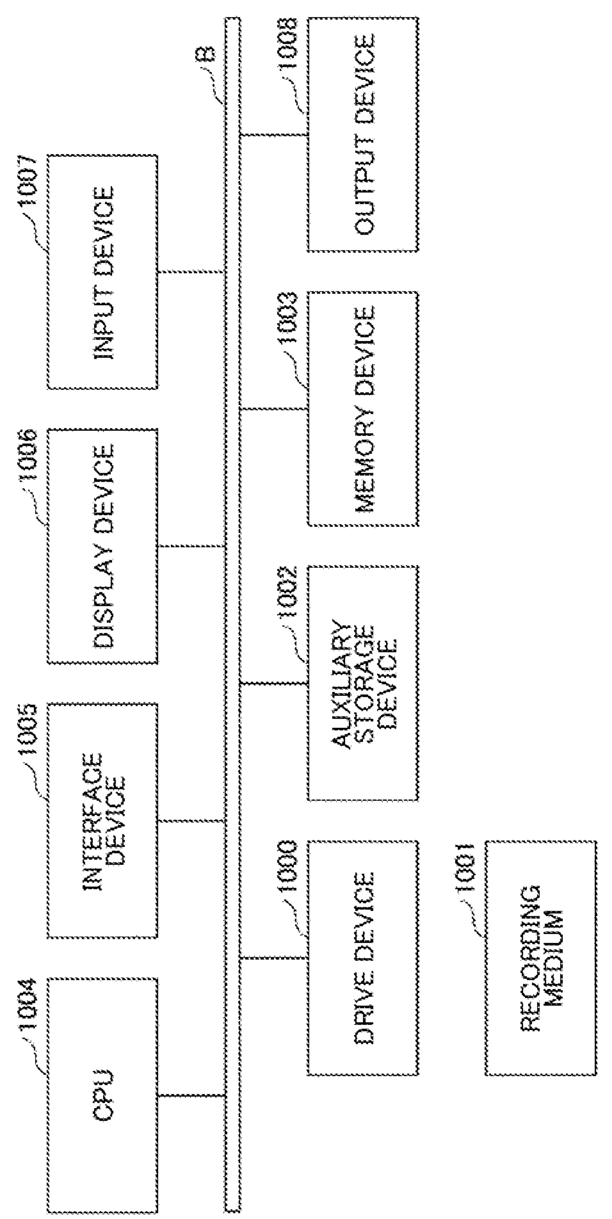
FIG. 6 is a diagram illustrating a hardware configuration example of a device.

FIG. 6 is a diagram illustrating a hardware configuration example of the above computer. The computer illustrated in FIG. 6 includes a drive device 1000, an auxiliary storage device 1002, a memory device 1003, a CPU 1004, an interface device 1005, a display device 1006, an input device 1007, an output device 1008, and the like, which are connected to each other via a bus B.

The program for implementing the processing in the computer is provided by, for example, a recording medium 1001 such as a CD-ROM or a memory card. When the recording medium 1001 in which the program is stored is set in the drive device 1000, the program is installed from the recording medium 1001 to the auxiliary storage device 1002 through the drive device 1000. However, the program need not necessarily be installed from the recording medium 1001, and may be downloaded from another computer via a network. The auxiliary storage device 1002 stores the installed program and stores necessary files, data, and the like.

The memory device 1003 reads and stores the program from the auxiliary storage device 1002 when there is an instruction to start the program. The CPU 1004 implements functions related to the control device 300 according to the program stored in the memory device 1003. The interface device 1005 is used as an interface for connection to a network. The display device 1006 displays a graphical user interface (GUI) or the like according to a program. The input device 1007 includes a keyboard and mouse, buttons, a touch panel, or the like, and is used to input various operation instructions. The output device 1008 outputs a calculation result.

Effects of Embodiment

With the technique according to the present embodiment, as many specific priority terminals as possible select the positions of movable base stations in a line-of-sight position from a plurality of movable base stations, and it is thus possible to maximize the likelihood that the specific priority terminal is in a redundant connection state and to avoid deterioration of communication quality due to unpredictable shielding or the like.

Further, since the antenna position/direction parameter #k that maximizes the coverage area quality (Ne or the like) is selected from among the combinations of antenna position/direction parameters that maximize Np, it is possible to improve the coverage area communication quality while preferentially guaranteeing the communication quality of the specific priority terminal.

Summary of Embodiment

This specification discloses at least a control device (control apparatus), a communication system, a control method, and a program according to the following items.

(Item 1)

A control apparatus in a wireless communication system including the control apparatus and a plurality of base stations, the control apparatus including:

an information acquisition unit that acquires position information of one or more specific priority terminals and shield sensing information;

a shield map generation unit that generates a shield map based on the shield sensing information;

a line-of-sight determination unit that determines whether or not there is a line of sight from an antenna of each base station to each specific priority terminal based on the position information and the shield map; and a base station control unit that controls movable base stations in the plurality of base stations such that a number of specific priority terminals in a line-of-sight state from the plurality of base stations becomes a maximum.

(Item 2)

The control apparatus according to Item 1, wherein the base station control unit selects a parameter that maximizes coverage area quality that is quality of an area covered by the plurality of base stations from among one or more parameters indicating positions and directions of antennas such that the number of specific priority terminals in a line-of-sight state from the plurality of base stations becomes a maximum, and controls the movable base station by using the parameter.

(Item 3)

The control apparatus according to Item 2, wherein the coverage area quality is the number of coverage area elements in a line-of-sight state from the base station.

(Item 4)

A communication system including:

the control apparatus according to any one of Items 1 to 3; and the plurality of base stations.

(Item 5)

A control method performed by a control apparatus in a wireless communication system including the control apparatus and a plurality of base stations, the control method including:

an information acquisition step of acquiring position information of one or more specific priority terminals and shield sensing information;

a shield map generation step of generating a shield map based on the shield sensing information;

a line-of-sight determination step of determining whether or not there is a line of sight from an antenna of each base station to each specific priority terminal based on the position information and the shield map; and a base station control step of controlling movable base stations in the plurality of base stations such that a number of specific priority terminals in a line-of-sight state from the plurality of base stations becomes a maximum.

(Item 6)

A program for causing a computer to function as each unit in the control apparatus according to any one of Items 1 to 3.

Although the present embodiment has been described above, the present invention is not limited to such a specific embodiment, and various modifications and changes can be made within the scope of the gist of the present invention described in the claims.

REFERENCE SIGNS LIST

10 Shield sensor
20 Shield
100 Movable base station
105 Movable unit
110 Operation mechanism unit
120 Wireless transmission/reception unit
130 Signal demodulation unit
200 Terminal
210 Wireless transmission/reception unit
220 Position information acquisition unit
230 Shield sensing
300 Control device
310 Line-of-sight determination unit
320 Shield map generation unit
330 Information acquisition unit
340 Base station control unit
350 Storage unit
400 Shield sensing unit
1000 Drive device
1001 Recording medium
1002 Auxiliary storage device
1003 Memory device
1004 CPU
1005 Interface device
1006 Display device
1007 Input device
1008 Output device

The invention claimed is:

1. A control apparatus in a wireless communication system including the control apparatus and a plurality of base stations including a movable first base station and a movable second base station, the control apparatus comprising:

a processor; and a memory that includes instructions, which when executed, cause the processor to execute a method, the method including:

acquiring position information of one or more specific priority terminals and shield sensing information;

generating a shield map based on the shield sensing information;

determining whether or not there is a line-of-sight state based on the position information and the shield map; and controlling a position of the first base station and a position of the second base station such that a number of the one or more specific priority terminals in the line-of-sight state from both the first base station and the second base station becomes a maximum wherein the number is at least 1, wherein the line-of-sight state is a state in which the one or more specific priority terminals are connectable to at least one of the base stations.

2. The control apparatus according to claim 1, wherein the controlling includes selecting a parameter that maximizes coverage area quality that is quality of a first area covered by the first base station and the second base station from among one or more parameters indicating positions and directions of antenna of each base station such that the number of specific priority terminals in the line-of-sight state from both the first base station and the second base station becomes a maximum wherein the number is at least 1, and controlling the position of the first base station and the position of the second base station by using the parameter.

3. The control apparatus according to claim 2, wherein the coverage area quality is a number of coverage area elements in the line-of-sight state from either one of the first base station or the second base station.

4. The control apparatus according to claim 3, wherein the coverage area element is the line-of-sight state from the first base station and the second base, the coverage area elements is divided into a plurality of areas, wherein the second area is smaller than the first area covered by the first base station and the second base station.

5. A communication system comprising:

the control apparatus according to claim 1; and the plurality of base stations.

6. A non-transitory computer-readable recording medium having computer-readable instructions stored thereon, which when executed, cause a computer including a memory and a processor to execute the method to function as each unit in the control apparatus according claim 1.

7. A control method performed by a computer in a control apparatus in a wireless communication system including the control apparatus and a plurality of base stations including a movable first base station and a movable second base station, the control method comprising:

acquiring position information of one or more specific priority terminals and shield sensing information;

generating a shield map based on the shield sensing information;

determining whether or not there is a line-of-sight state based on the position information and the shield map; and controlling a position of the first base station and a position of the second base station such that a number of the one or more specific priority terminals in the line-of-sight state from both the first base station and the second base station becomes a maximum wherein the number is at least 1, wherein the line-of-sight state is a state in which the one or more specific priority terminals are connectable to at least one of the base stations.

* * * * *